May 8, 1951 D. D. ROBERTS 2,551,903
FOWL AND ANIMAL TRAP
Filed April 6, 1950

D. D. Roberts
INVENTOR
BY CA Snow & Co.
ATTORNEYS.

Patented May 8, 1951

2,551,903

UNITED STATES PATENT OFFICE 2,551,903

FOWL AND ANIMAL TRAP

Darling D. Roberts, Valdosta, Ga.

Application April 6, 1950, Serial No. 154,223

2 Claims. (Cl. 43—61)

This invention relates to trap construction, and aims to provide a trap designed for trapping fowl, and various types of field animals.

An important object of the invention is to provide a trap of this character which will be actuated by the weight of the fowl or animal entering the trap, the construction of the trap being such that when operated, it will insure against the escape of the fowl or animal caught therein.

Another important object of the invention is to provide a trap which may be set from a point exteriorly thereof and without danger of the operator having his hands injured by spring jaws or similar devices commonly used in trap construction.

Another important object of the invention is to provide a device of this character which may be effectively used as a trap nest in trapping laying hens.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
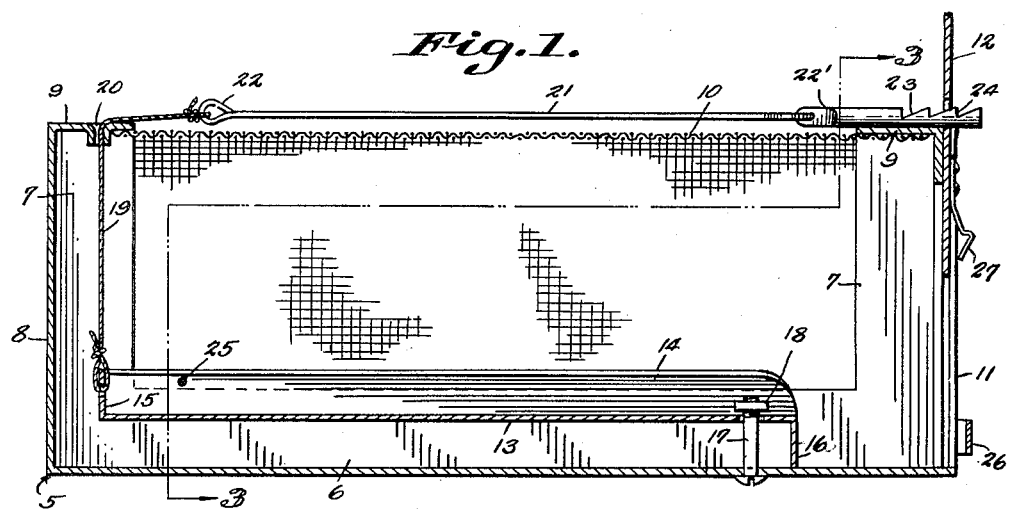
Figure 1 is a longitudinal sectional view through a trap constructed in accordance with the invention.
Figure 2:
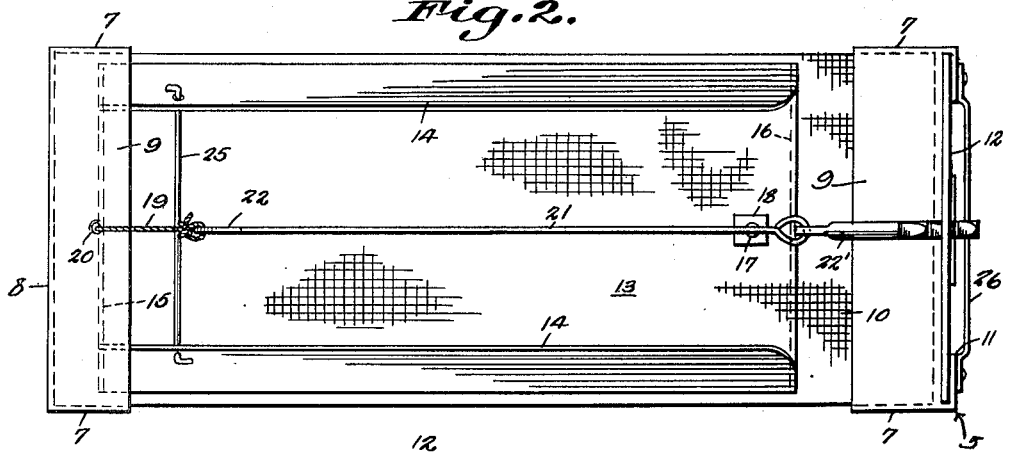
Fig. 2 is a plan view of the trap.
Figure 3:
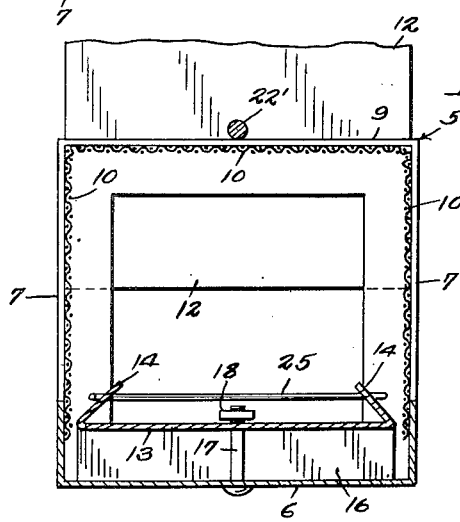
Fig. 3 is a sectional view taken on line 3—3 of Fig. 1.

Referring to the drawing in detail, the body portion which is box-like in formation, is indicated generally by the reference character 5, the body portion comprising the bottom 6 and vertical side members 7 which are formed integral therewith, the side members 7 being also formed integral with the rear end wall 8 and front and rear top pieces 9.

The space between the side members 7 and front and rear top pieces 9, is closed by the foraminous material 10, which is secured in any desirable manner, to the bottom, and side pieces, as by soldering.

At the front end of the body portion are guides formed by the flanges 11, in which guides the vertically sliding closure 12 moves, the closure 12 being adapted to move downwardly to close the open front end or entrance of the trap.

The treadle pan is indicated by the reference character 13, and as shown, the treadle pan is provided with inwardly inclined flanges 14 disposed along the longitudinal side edges of the pan, the flanges being secured at their rear ends, by the rear end wall 15.

At the front end of the treadle pan 13, is the downwardly extended flange 16 which provides a support and pivot for the front end of the treadle pan. The bottom of the treadle pan is provided with an opening through which the bolt 17 extends, the bolt being also extended through a registering opening in the bottom of the body portion securing the pan within the body portion. The nut 18 which is positioned on the upper threaded end of the bolt 17, will provide means for securing the treadle pan against displacement, the treadle pan being however permitted to pivot or tilt on the flange 16.

The end wall 15 is provided with an opening through which the cord 19 extends, and is secured, the cord passing upwardly through the opening 20 formed in the rear top piece 9, from where the cord extends forwardly and is connected with the rod 21, through the medium of the eye 22, formed at the rear end of the rod 21.

Connected with the forward end of the rod 21, is the notched bar 22' the notches 23 thereof having inclined sides defining shoulders 24 for engagement with the sliding closure 12. The sliding closure 12 is provided with an opening, through which the bar 22' extends, as shown by Fig. 1 of the drawing, so that the closure 12 is held in its open or set position.

When it is desired to use the trap in trapping animals, the bar 22' is moved so that the innermost notch of the bar will be engaged by the sliding closure. This will of course move the inner end of the treadle pan upwardly to render the trap less sensitive to the end that greater weight will be required to operate the pan, than would be required when the closure is seated in the outer notch 24, in which case the trap would be set for trapping fowl or birds.

Extending across the rear end of the treadle pan 13, is the bait rod 25 to which the bait is secured to attract the fowl or animals into the trap.

It will of course be understood that the combined length of the cord 19 and rod 21 and notched bar 22', is such that when the bar 22' has been moved to the position as shown by Fig. 1 and inserted in the opening of the sliding closure 12, the cord 19 will be taut and the rear end of the treadle pan will be elevated. At the same time, the closure 12 will be elevated so that the front end of the trap is open to admit fowl or animals to the interior of the trap.

Extending across the lower front end of the trap, is the keeper bar 26 with which the spring clip 27 carried by the closure 12, cooperates, as the closure 12 moves to its closed position, thereby securing the closure closed, until manually operated to release the closure for resetting the trap.

In use, the trap is baited and the closure is moved to the position as shown by Fig. 1, with the bar 22' in contact with the upper edge of the opening in the closure 12. It is obvious that as a fowl or animal passes into the trap to remove the bait, the weight of the fowl or animal will cause the treadle pan to swing downwardly at the rear end. As the rear end of the treadle pan moves downwardly, the cord 19 will operate to pull the rod 21 and bar 22' rearwardly, releasing the closure 12 which will fall by gravity to a closing position, holding the fowl or animal trapped within the body portion.

It will of course be understood that this device may be effectively employed as a trap nest in trapping laying hens to segregate the laying hens from the non-laying hens.

Having thus described the invention, what is claimed is:

1. In a trap of the class described, a body portion having an open front end and a closed rear end, a vertically sliding closure mounted at the open end of the body portion, a pivoted treadle pan mounted within the body portion, a cord extending from the rear end of the treadle pan, a rod connected with the cord and extending along the upper surface of the body portion, a bar having notches connected with the rod, said closure having an opening in which the bar extends, the notches of the bar adapted to engage the upper edge of the closure opening normally holding the closure in an open position, and holding the rear end of the treadle pan elevated, said treadle pan being movable downwardly under the weight of an animal thereon, whereby said bar is moved out of contact with the closure releasing the closure and closing the open end of the trap.

2. In a trap of the class described, a body portion having an open front end and a vertical rear wall, the sides and top of the body portion being constructed of foraminous material, a sliding closure operating at the open end of the body portion, a treadle pan mounted within the body portion, said closure having an opening, a bar having notches movable within the opening, the notches adapted to engage the upper edge of the closure opening, normally holding the sliding closure in its open position, and means for connecting the pivoted treadle pan with the bar whereby downward movement of the treadle pan under the weight of an animal in the trap operates the bar releasing the bar whereby the closure moves to its closed position.

DARLING D. ROBERTS.

REFERENCES CITED

The following references are of record in the file of this patent:

UNITED STATES PATENTS

| Number | Name | Date |
|--------|------|------|
| 1,421,298 | Paetta | June 27, 1922 |

FOREIGN PATENTS

| Number | Country | Date |
|--------|---------|------|
| 18,220 | Denmark | Dec. 8, 1913 |